US009384711B2

(12) United States Patent
Ergan et al.

(10) Patent No.: US 9,384,711 B2
(45) Date of Patent: Jul. 5, 2016

(54) SPECULATIVE RENDER AHEAD AND CACHING IN MULTIPLE PASSES

(75) Inventors: Cenk Ergan, Bellevue, WA (US); Li-Hsin Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 693 days.

(21) Appl. No.: 13/397,299

(22) Filed: Feb. 15, 2012

(65) Prior Publication Data

US 2013/0208012 A1    Aug. 15, 2013

(51) Int. Cl.
G09G 5/00 (2006.01)
G09G 5/14 (2006.01)
G09G 5/32 (2006.01)
G09G 5/34 (2006.01)
G06F 3/14 (2006.01)

(52) U.S. Cl.
CPC .. *G09G 5/14* (2013.01); *G09G 5/32* (2013.01); *G09G 5/346* (2013.01); *G06F 3/14* (2013.01); *G09G 2354/00* (2013.01); *G09G 2360/08* (2013.01); *G09G 2360/121* (2013.01); *G09G 2370/027* (2013.01); *G09G 2370/10* (2013.01)

(58) Field of Classification Search
None
See application file for complete search history.

(56) References Cited

U.S. PATENT DOCUMENTS

| | | | |
|---|---|---|---|
| 5,247,674 A | 9/1993 | Kogure | |
| 5,270,103 A | 12/1993 | Oliver et al. | |
| 5,564,002 A | 10/1996 | Brown | |
| 5,588,071 A | 12/1996 | Schultz | |
| 5,590,327 A | 12/1996 | Biliris et al. | |
| 5,696,675 A | 12/1997 | Nakamura et al. | |
| 5,729,704 A | 3/1998 | Stone et al. | |
| 5,781,195 A * | 7/1998 | Marvin | 345/428 |
| 5,784,699 A | 7/1998 | McMahon et al. | |
| 5,801,717 A | 9/1998 | Engstrom et al. | |
| 5,841,439 A * | 11/1998 | Pose et al. | 345/418 |
| 5,844,569 A | 12/1998 | Eisler et al. | |
| 5,870,769 A | 2/1999 | Freund | |
| 5,918,239 A | 6/1999 | Allen et al. | |
| 5,986,670 A | 11/1999 | Dries et al. | |

(Continued)

FOREIGN PATENT DOCUMENTS

| | | |
|---|---|---|
| AU | 2011101579 | 2/2012 |
| CN | 1806258 | 7/2006 |

(Continued)

OTHER PUBLICATIONS

"Copying Render Options", Retrieved at <<http://download.autodesk.com/global/docs/softimage2013/en_us/userguide/index.html?url=files/renderoptions_managing_CopyingRenderOptions.htm,topicNumber=d28e375988>>, Retrieved Date: Feb. 9, 2012, pp. 3.

(Continued)

*Primary Examiner* — Anh-Tuan V Nguyen
(74) *Attorney, Agent, or Firm* — Bryan Webster; Raghu Chinagudabha; Micky Minhas (57) ABSTRACT

Various embodiments are directed to intelligently rendering or pre-rendering content that may likely be brought into an associated viewport during a user's interaction with the content. In at least some embodiments, the process of caching pre-rendered content is separated from a determination of which regions outside of the viewport are to be kept up to date over use and time. Further, at least some embodiments perform rendering activities in multiple passes in an effort to reduce potential delays in the user visible content reaching completion, without interfering with other work that an associated application or system performs during rendering.

20 Claims, 7 Drawing Sheets

(56) References Cited

U.S. PATENT DOCUMENTS

| | | | |
|---|---|---|---|
| 6,067,093 A | 5/2000 | Grau et al. | |
| 6,091,422 A | 7/2000 | Ouaknine et al. | |
| 6,182,133 B1 | 1/2001 | Horvitz | |
| 6,191,796 B1 | 2/2001 | Tarr | |
| 6,226,017 B1 | 5/2001 | Goossen et al. | |
| 6,236,410 B1 | 5/2001 | Politis et al. | |
| 6,249,289 B1 | 6/2001 | Arnaud et al. | |
| 6,330,003 B1 | 12/2001 | Curtis et al. | |
| 6,335,765 B1 | 1/2002 | Daly et al. | |
| 6,344,855 B1 | 2/2002 | Fisher et al. | |
| 6,411,302 B1 | 6/2002 | Chiraz | |
| 6,426,750 B1 | 7/2002 | Hoppe | |
| 6,501,474 B1 | 12/2002 | Thomson et al. | |
| 6,504,545 B1* | 1/2003 | Browne et al. | 345/473 |
| 6,525,722 B1 | 2/2003 | Deering | |
| 6,809,745 B1 | 10/2004 | O'Donnell et al. | |
| 6,850,967 B1 | 2/2005 | Spencer et al. | |
| 6,864,886 B1 | 3/2005 | Cavallaro | |
| 6,900,813 B1 | 5/2005 | Stefanidis | |
| 7,031,517 B1 | 4/2006 | Le et al. | |
| 7,102,635 B2 | 9/2006 | Shih | |
| 7,127,592 B2 | 10/2006 | Abraham et al. | |
| 7,130,890 B1 | 10/2006 | Kumar et al. | |
| 7,133,054 B2 | 11/2006 | Aguera y Arcas | |
| 7,307,631 B2 | 12/2007 | Robart | |
| 7,342,580 B1 | 3/2008 | Peterson | |
| 7,400,322 B1 | 7/2008 | Urback | |
| 7,511,718 B2 | 3/2009 | Subramanian et al. | |
| 7,594,093 B1 | 9/2009 | Kancherla | |
| 7,667,715 B2 | 2/2010 | MacInnis | |
| 7,738,688 B2 | 6/2010 | Eichhorn | |
| 7,792,876 B2 | 9/2010 | Easwar | |
| 7,877,708 B2 | 1/2011 | Zinn et al. | |
| 7,941,758 B2 | 5/2011 | Tremblay | |
| 8,010,624 B2 | 8/2011 | Scott et al. | |
| 8,161,087 B2 | 4/2012 | Latzina | |
| 8,255,818 B2 | 8/2012 | Bales et al. | |
| 8,284,211 B2 | 10/2012 | Darsa et al. | |
| 8,306,399 B1 | 11/2012 | Trottier et al. | |
| 8,307,300 B1* | 11/2012 | Fisher et al. | 715/800 |
| 8,314,809 B1 | 11/2012 | Grabowski et al. | |
| 8,341,245 B1 | 12/2012 | Roskind et al. | |
| 8,438,474 B1* | 5/2013 | Lloyd | 715/234 |
| 8,549,421 B2 | 10/2013 | Gohda et al. | |
| 2002/0005854 A1 | 1/2002 | Deering et al. | |
| 2002/0005891 A1 | 1/2002 | Wilson et al. | |
| 2002/0015042 A1 | 2/2002 | Robotham et al. | |
| 2002/0049819 A1 | 4/2002 | Matsuda et al. | |
| 2002/0075327 A1 | 6/2002 | Stall | |
| 2002/0089547 A1 | 7/2002 | Huapaya | |
| 2002/0094125 A1 | 7/2002 | Guo | |
| 2002/0110057 A1 | 8/2002 | Kadlec et al. | |
| 2002/0163530 A1 | 11/2002 | Takakura et al. | |
| 2002/0163542 A1 | 11/2002 | Costea et al. | |
| 2003/0001847 A1* | 1/2003 | Doyle et al. | 345/501 |
| 2003/0020719 A1* | 1/2003 | Abgrall | 345/501 |
| 2003/0091232 A1 | 5/2003 | Kalevo et al. | |
| 2003/0189597 A1 | 10/2003 | Anderson et al. | |
| 2003/0227460 A1 | 12/2003 | Schinnerer | |
| 2003/0229605 A1 | 12/2003 | Herrera et al. | |
| 2004/0003188 A1 | 1/2004 | Rao | |
| 2004/0008212 A1 | 1/2004 | O'Neill | |
| 2004/0107380 A1 | 6/2004 | Vollschwitz | |
| 2004/0150647 A1 | 8/2004 | Aleksic et al. | |
| 2004/0160446 A1 | 8/2004 | Gosalia et al. | |
| 2004/0160449 A1 | 8/2004 | Gossalia et al. | |
| 2004/0162930 A1 | 8/2004 | Forin et al. | |
| 2004/0189668 A1 | 9/2004 | Beda et al. | |
| 2004/0212619 A1 | 10/2004 | Saito et al. | |
| 2005/0035980 A1 | 2/2005 | Lonsing | |
| 2005/0050297 A1 | 3/2005 | Essick et al. | |
| 2005/0071777 A1* | 3/2005 | Roessler et al. | 715/810 |
| 2005/0088447 A1* | 4/2005 | Hanggie et al. | 345/545 |
| 2005/0140683 A1 | 6/2005 | Collins et al. | |
| 2005/0172098 A1 | 8/2005 | Worley | |
| 2005/0190178 A1* | 9/2005 | Taghavi et al. | 345/418 |
| 2005/0235124 A1 | 10/2005 | Pomaranski et al. | |
| 2005/0283566 A1 | 12/2005 | Callaghan | |
| 2006/0107229 A1 | 5/2006 | Matthews et al. | |
| 2006/0112254 A1 | 5/2006 | Piper et al. | |
| 2006/0200778 A1 | 9/2006 | Gritzman et al. | |
| 2006/0248469 A1 | 11/2006 | Czerwinski et al. | |
| 2006/0290705 A1 | 12/2006 | White et al. | |
| 2007/0013708 A1* | 1/2007 | Barcklay et al. | 345/557 |
| 2007/0018992 A1 | 1/2007 | Wong | |
| 2007/0035543 A1 | 2/2007 | David et al. | |
| 2007/0040788 A1* | 2/2007 | Saha | 345/98 |
| 2007/0047760 A1 | 3/2007 | Sharma et al. | |
| 2007/0088768 A1 | 4/2007 | Passerini et al. | |
| 2007/0091098 A1 | 4/2007 | Zhang et al. | |
| 2007/0101066 A1 | 5/2007 | Al Sukhni et al. | |
| 2007/0113194 A1 | 5/2007 | Bales et al. | |
| 2007/0133900 A1 | 6/2007 | Nielsen et al. | |
| 2007/0154087 A1 | 7/2007 | Cho et al. | |
| 2007/0291044 A1 | 12/2007 | Xu et al. | |
| 2008/0001962 A1 | 1/2008 | Lefebvre et al. | |
| 2008/0040568 A1 | 2/2008 | Bhattacharya | |
| 2008/0071559 A1 | 3/2008 | Arrasvuori | |
| 2008/0100613 A1 | 5/2008 | Woo et al. | |
| 2008/0136840 A1 | 6/2008 | Chang et al. | |
| 2008/0140981 A1 | 6/2008 | Kim | |
| 2008/0165268 A1 | 7/2008 | Takahashi et al. | |
| 2008/0166033 A1 | 7/2008 | Bueno et al. | |
| 2008/0198168 A1 | 8/2008 | Jiao et al. | |
| 2008/0235292 A1* | 9/2008 | Janin et al. | 707/201 |
| 2008/0238928 A1 | 10/2008 | Poddar et al. | |
| 2008/0244458 A1 | 10/2008 | Brugiolo et al. | |
| 2008/0285074 A1 | 11/2008 | Wilson | |
| 2008/0291201 A1 | 11/2008 | Lafon | |
| 2008/0298689 A1 | 12/2008 | Ashbrook et al. | |
| 2009/0102842 A1 | 4/2009 | Li | |
| 2009/0129635 A1 | 5/2009 | Abe | |
| 2009/0141895 A1* | 6/2009 | Anderson et al. | 380/252 |
| 2009/0172331 A1 | 7/2009 | Vembu et al. | |
| 2009/0208110 A1 | 8/2009 | Hoppe et al. | |
| 2009/0210482 A1 | 8/2009 | Wynn et al. | |
| 2009/0213081 A1 | 8/2009 | Case, Jr. | |
| 2009/0213112 A1* | 8/2009 | Zhu et al. | 345/419 |
| 2009/0262122 A1 | 10/2009 | Darsa et al. | |
| 2009/0284537 A1 | 11/2009 | Hong et al. | |
| 2009/0315900 A1 | 12/2009 | Ungureanu et al. | |
| 2009/0322764 A1* | 12/2009 | Saini et al. | 345/501 |
| 2010/0011316 A1* | 1/2010 | Sar et al. | 715/784 |
| 2010/0042945 A1 | 2/2010 | Bauchot et al. | |
| 2010/0073379 A1 | 3/2010 | Berger et al. | |
| 2010/0079480 A1 | 4/2010 | Murtagh | |
| 2010/0162126 A1 | 6/2010 | Donaldson et al. | |
| 2010/0169310 A1 | 7/2010 | Latzina | |
| 2010/0207957 A1 | 8/2010 | Taneja et al. | |
| 2010/0277504 A1 | 11/2010 | Song | |
| 2010/0278442 A1 | 11/2010 | Parsons et al. | |
| 2010/0281402 A1* | 11/2010 | Staikos et al. | 715/760 |
| 2010/0289806 A1 | 11/2010 | Lao et al. | |
| 2010/0293504 A1 | 11/2010 | Hachiya | |
| 2010/0309205 A1 | 12/2010 | Novosad | |
| 2010/0313125 A1 | 12/2010 | Fleizach et al. | |
| 2010/0315319 A1 | 12/2010 | Cok et al. | |
| 2010/0321377 A1 | 12/2010 | Gay et al. | |
| 2010/0325589 A1* | 12/2010 | Ofek et al. | 715/854 |
| 2011/0022984 A1* | 1/2011 | van der Meulen et al. | 715/830 |
| 2011/0043553 A1 | 2/2011 | Brown et al. | |
| 2011/0069881 A1 | 3/2011 | Kitago | |
| 2011/0072391 A1 | 3/2011 | Hanggie et al. | |
| 2011/0078624 A1 | 3/2011 | Missig et al. | |
| 2011/0102440 A1 | 5/2011 | Yuen et al. | |
| 2011/0138314 A1 | 6/2011 | Mir et al. | |
| 2011/0141123 A1 | 6/2011 | Kumar | |
| 2011/0154248 A1 | 6/2011 | Tsuruoka | |
| 2011/0173569 A1 | 7/2011 | Howes et al. | |
| 2011/0199377 A1* | 8/2011 | Jang et al. | 345/426 |
| 2011/0252299 A1* | 10/2011 | Lloyd et al. | 715/234 |
| 2011/0267370 A1 | 11/2011 | Tanaka | |
| 2011/0304699 A1 | 12/2011 | Ito et al. | |
| 2012/0042252 A1 | 2/2012 | Neerudu et al. | |

(56) References Cited

U.S. PATENT DOCUMENTS

| | | | |
|---|---|---|---|
| 2012/0050313 A1 | 3/2012 | Gruber | |
| 2012/0081368 A1 | 4/2012 | Park et al. | |
| 2012/0092335 A1 | 4/2012 | Kim et al. | |
| 2012/0102034 A1 | 4/2012 | Kim et al. | |
| 2012/0115600 A1 | 5/2012 | Dietrich et al. | |
| 2012/0151308 A1 | 6/2012 | Falkenberg et al. | |
| 2012/0188342 A1 | 7/2012 | Gervautz et al. | |
| 2012/0213435 A1 | 8/2012 | Donovan et al. | |
| 2012/0218381 A1 | 8/2012 | Uro et al. | |
| 2012/0229464 A1 | 9/2012 | Fishwick | |
| 2012/0235933 A1 | 9/2012 | Yamamura et al. | |
| 2012/0249741 A1 | 10/2012 | Maciocci et al. | |
| 2012/0251003 A1 | 10/2012 | Perbet et al. | |
| 2012/0254780 A1 | 10/2012 | Mouton et al. | |
| 2012/0324043 A1 | 12/2012 | Burkard et al. | |
| 2013/0007260 A1 | 1/2013 | Jain et al. | |
| 2013/0007590 A1* | 1/2013 | Rivera et al. | 715/234 |
| 2013/0019159 A1 | 1/2013 | Civelli et al. | |
| 2013/0021262 A1 | 1/2013 | Chen | |
| 2013/0050249 A1* | 2/2013 | Grabowski et al. | 345/619 |
| 2013/0073509 A1 | 3/2013 | Burkard et al. | |
| 2013/0073670 A1 | 3/2013 | Das et al. | |
| 2013/0074080 A1* | 3/2013 | Jimenez | 718/102 |
| 2013/0093750 A1* | 4/2013 | Cornell et al. | 345/419 |
| 2013/0321453 A1 | 12/2013 | Fink | |
| 2013/0321454 A1 | 12/2013 | Fink | |
| 2013/0321455 A1 | 12/2013 | Fink | |
| 2013/0321471 A1 | 12/2013 | Fink | |
| 2014/0372511 A1 | 12/2014 | Kapadia et al. | |

FOREIGN PATENT DOCUMENTS

| | | |
|---|---|---|
| WO | WO-9522104 | 8/1995 |
| WO | WO-2011037966 | 3/2011 |

OTHER PUBLICATIONS

"Shading OpenGL Shaders", Retrieved at <<http://www.sidefx.com/docs/houdini9.5/shade/opengl>>, Retrieved Date: Feb. 9, 2012, pp. 7.

"International Search Report", Mailed Date: May 16, 2013, Application No. PCT/US2013/023354, Filed Date: Jan. 28, 2013, pp. 10.

Ergan, Cenk et al., "U.S. Application as Filed", U.S. Appl. No. 13/397,299, filed Feb. 15, 2012, 47 pages.

Ivan "Google Adds Voice Search, Visual Search and Results Prerendering", Retrieved from <http://www.mt-soft.com.ar/2011/06/14/google-adds-voice-search-visual-search-and-results-prerendering/?utm_source=feedburner&utm_medium=feed&utm_campaign=Feed%3A+mtsoftblog+%28MT-Soft%29> on May 9, 2013, (Jun. 14, 2011), 6 pages.

Lentell, Gour "Amazon Silk and Cloud Browsers", Retrieved from <http://www.binu.com/2011/09/amazon-silk-and-cloud-browsers/> May 9, 2013, Sep. 30, 2011, 3 pages.

"International Search Report and Written Opinion", Application No. PCT/US2013/041485, Oct. 11, 2013, 16 pages.

"Non-Final Office Action", U.S. Appl. No. 13/485,815, Dec. 18, 2013, 16 pages.

"Viewing Virtual Surface Aids Reclassification", Retrieved at: https://developer.apple.com/library/mac/#documentation/graphicsimaging/Conceptual/OpenGL-MacProgGuide/opengl_contexts/opengl_contexts.html, Oct. 2010, 2 pages.

"IDCompositionVirtualSurface::Trim method", Retrieved at: http://msdn.microsoft.com/en-us/library/windows/desktop/hh449137(v=vs.85).aspx—on Jun. 15, 2012, 2012, 2 pages.

"Non-Final Office Action", U.S. Appl. No. 13/485,832, Dec. 19, 2013, 21 pages.

"Non-Final Office Action", U.S. Appl. No. 13/485,805, Dec. 19, 2013, 28 pages.

"Polygonal Modeling", Retrieved from <http://web.archive.org/web/20120303001434/http://en.wikipedia.org/wiki/Polygonal_modeling>, Mar. 3, 2012, 6 pages.

"Working with Rendering Contexts", Retrieved at: http://www.microimages.com/documentation/TechGuides/77LASsurfReclas.pdf, 2010, 9 pages.

Corbet, et al.,' "Linux Device Drivers", Third Edition, Chapter 8—Allocating Memory, Feb. 2005, 23 pages.

Moreland, et al.,' "Sort-Last Parallel Rendering for Viewing Extremely Large Data Sets on Tile Displays", In Proceedings of the IEEE 2001 symposium on parallel and large-data visualization and graphics., 2001, pp. 85-93.

Shade, "Tiling Layered Depth Images", SiGGRAPH 2000—http://grail.cs.washington.edu/projects/ldi/data/TilingLDIs.pdf, 2000, 10 pages.

"Non-Final Office Action", U.S. Appl. No. 13/485,825, Jan. 30, 2014, 17 pages.

"Final Office Action", U.S. Appl. No. 13/485,832, Apr. 22, 2014, 20 pages.

"Desktop Window Manager", Retrieved from <http://en.wikipedia.org/wiki/windex.php?title=Desktop_window_manager&oldid=425547889#External_links> on Jun. 3, 2014, Apr. 2011, 5 pages.

"Final Office Action", U.S. Appl. No. 13/485,805, Jun. 26, 2014, 30 pages.

"Final Office Action", U.S. Appl. No. 13/485,815, Jun. 11, 2014, 18 pages.

"Final Office Action", U.S. Appl. No. 13/485,825, Jun. 12, 2014, 17 pages.

"Final Office Action", U.S. Appl. No. 13/485,832, Aug. 26, 2014, 24 pages.

"International Search Report and Written Opinion", Application No. PCT/US2013/061010, Aug. 20, 2014, 11 Pages.

"Non-Final Office Action", U.S. Appl. No. 13/485,832, Jun. 2, 2014, 20 pages.

"Spaces (software)", Retrieved from <http://en.wikipedia.org/w/index.php?title=Spaces_%28software%29&oldid=467135782> on Jun. 2, 2014, Dec. 22, 2011, 3 pages.

Gui "Tabbed browsing. Why close the application on closing the last tab?", Retrieved from <http://ux.stackexchange.com/questions/10598/tabbed-browsing-why-close-the-application-on-closing-the-last-tab> on Jun. 11, 2014, Aug. 28, 2011, 3 pages.

"Compositing Window Manager", Retrieved from <http://en.wikipedia.org/w/index.php?title=Compositing_window_manager&oldid=492324820> on Jul. 1, 2014, May 13, 2012, 11 pages.

"Final Office Action", U.S. Appl. No. 13/485,815, Nov. 19, 2014, 24 pages.

"Final Office Action", U.S. Appl. No. 13/485,825, Jan. 26, 2015, 35 pages.

"Non-Final Office Action", U.S. Appl. No. 13/485,805, Nov. 6, 2014, 34 pages.

"Non-Final Office Action", U.S. Appl. No. 13/485,815, Sep. 23, 2014, 20 pages.

"Non-Final Office Action", U.S. Appl. No. 13/485,825, Oct. 2, 2014, 27 pages.

"Non-Final Office Action", U.S. Appl. No. 13/485,832, Nov. 28, 2014, 29 pages.

"Open GL Programming Guide", Seventh Edition, The Official Guide to Learning Open GL, Versions 3.0 and 3.1. Addison-Wesley, Jul. 2009, 1019 pages.

"Final Office Action", U.S. Appl. No. 13/918,869, Jul. 14, 2015, 9 pages.

"Foreign Office Action", CN Application No. 201210211623.9, Aug. 31, 2015, 7 pages.

"Notice of Allowance", U.S. Appl. No. 13/485,815, Jul. 16, 2015, 11 pages.

"Notice of Allowance", U.S. Appl. No. 13/485,825, Aug. 28, 2015, 7 pages.

"Notice of Allowance", U.S. Appl. No. 13/485,832, Aug. 28, 2015, 8 pages.

"Second Written Opinion", Application No. PCT/US2013/061010, Jun. 25, 2015, 7 Pages.

"Supplementary European Search Report", EP Application No. 13749288.0, Jun. 19, 2015, 9 pages.

(56) References Cited

OTHER PUBLICATIONS

"File Explorer", Retrieved from <http://en.wikipedia.org/w/index.php?title=File_Explorer&oldid=425043676> on Apr. 3, 2015, Apr. 20, 2011, 13 pages.

"Final Office Action", U.S. Appl. No. 13/485,805, Mar. 24, 2015, 35 pages.

"Final Office Action", U.S. Appl. No. 13/485,832, Apr. 3, 2015, 43 pages.

"Foreign Office Action", CN Application No. 201310211477.X, May 5, 2015, 16 pages.

"Non-Final Office Action", U.S. Appl. No. 13/485,815, Apr. 23, 2015, 32 pages.

"Non-Final Office Action", U.S. Appl. No. 13/918,869, Mar. 30, 2015, 13 pages.

Miles, "theForger's Win32 API Programming Tutorial—A Simple Window", Retrieved from <https://web.archive.org/web/20100211130846/http://www.winprog.org/tutorial/simple_window.html> on Mar. 24, 2015, 1998, 5 pages.

Supplementary Search Report Issued in European Patent Application No. 13749288.0, Mailed Date: Oct. 26, 2015, 14 Pages.

Notice of Allowance dated Nov. 6, 2015 U.S. Appl. No. 13/485,805.

\* cited by examiner

Fig. 6 though other parts that they should be attached to. As such, by
trimming or discarding invalidated data such that it is not
rendered and, instead, replaced by placeholder content,
inconsistencies are reduced or eliminated. Further, at least
some embodiments perform rendering activities in multiple
passes in an effort to reduce potential delays in the user visible
content reaching completion, without interfering with other
work that an associated application or system performs in
responding to user interactions, filtering/pivoting data, or
fetching new data and processing/updating content in place.
SPECULATIVE RENDER AHEAD AND CACHING IN MULTIPLE PASSES

BACKGROUND

In today's world of computing, users frequently find themselves viewing and navigating within large and rich content, e.g. a complex web page that does not entirely fit on the screen. Newer user interfaces such as touch and natural user interfaces (NUIs) allow users to scroll, pan, and zoom rapidly. Rendering content that comes into the viewport during these manipulations can be expensive in terms of processing overhead and can lead to a degraded user experience if, for example, rendering activities fall behind the user's manipulations. Falling behind in rendering can lead to gaps of missing content and visual jarring until the rendering activities catch up to the user's manipulations. On the other hand, aggressive rendering ahead and competing with the application for resources can cause the loading of content, such as a web page, or responding to user interactions to become slower.

SUMMARY

This Summary is provided to introduce a selection of concepts in a simplified form that are further described below in the Detailed Description. This Summary is not intended to identify key features or essential features of the claimed subject matter.

Various embodiments are directed to intelligently rendering or pre-rendering content that may likely be brought into an associated viewport during a user's interaction with the content. In at least some embodiments, the process of caching pre-rendered content is separated from a determination of which regions outside of the viewport are to be kept up to date over use and time. Various embodiments are directed to maintaining visual coherence in terms of a consistent user-perceived view. In at least some embodiments, measures are taken to reduce or eliminate seams, visual tearing or corruption such that various parts of the user interface do not lag behind other parts that they should be attached to. As such, by trimming or discarding invalidated data such that it is not rendered and, instead, replaced by placeholder content, inconsistencies are reduced or eliminated. Further, at least some embodiments perform rendering activities in multiple passes in an effort to reduce potential delays in the user visible content reaching completion, without interfering with other work that an associated application or system performs in responding to user interactions, filtering/pivoting data, or fetching new data and processing/updating content in place.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments are directed to intelligently rendering or pre-rendering content that may likely be brought into an associated viewport during a user's interaction with the content. In at least some embodiments, the process of caching pre-rendered content is separated from a determination of which regions outside of the viewport are to be kept up to date over use and time. Various embodiments are directed to maintaining visual coherence in terms of a consistent user-perceived view. In at least some embodiments, measures are taken to reduce or eliminate seams, visual tearing or corruption such that various parts of the user interface do not lag behind other parts that they should be attached to. As such, by trimming or discarding invalidated data such that it is not rendered and, instead, replaced by placeholder content, inconsistencies are reduced or eliminated. Further, at least some embodiments perform rendering activities in multiple passes in an effort to reduce potential delays in the user visible content reaching completion, without interfering with other work that an associated application or system performs in responding to user interactions, filtering/pivoting data, or fetching new data and processing/updating content in place.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

Figure 1:
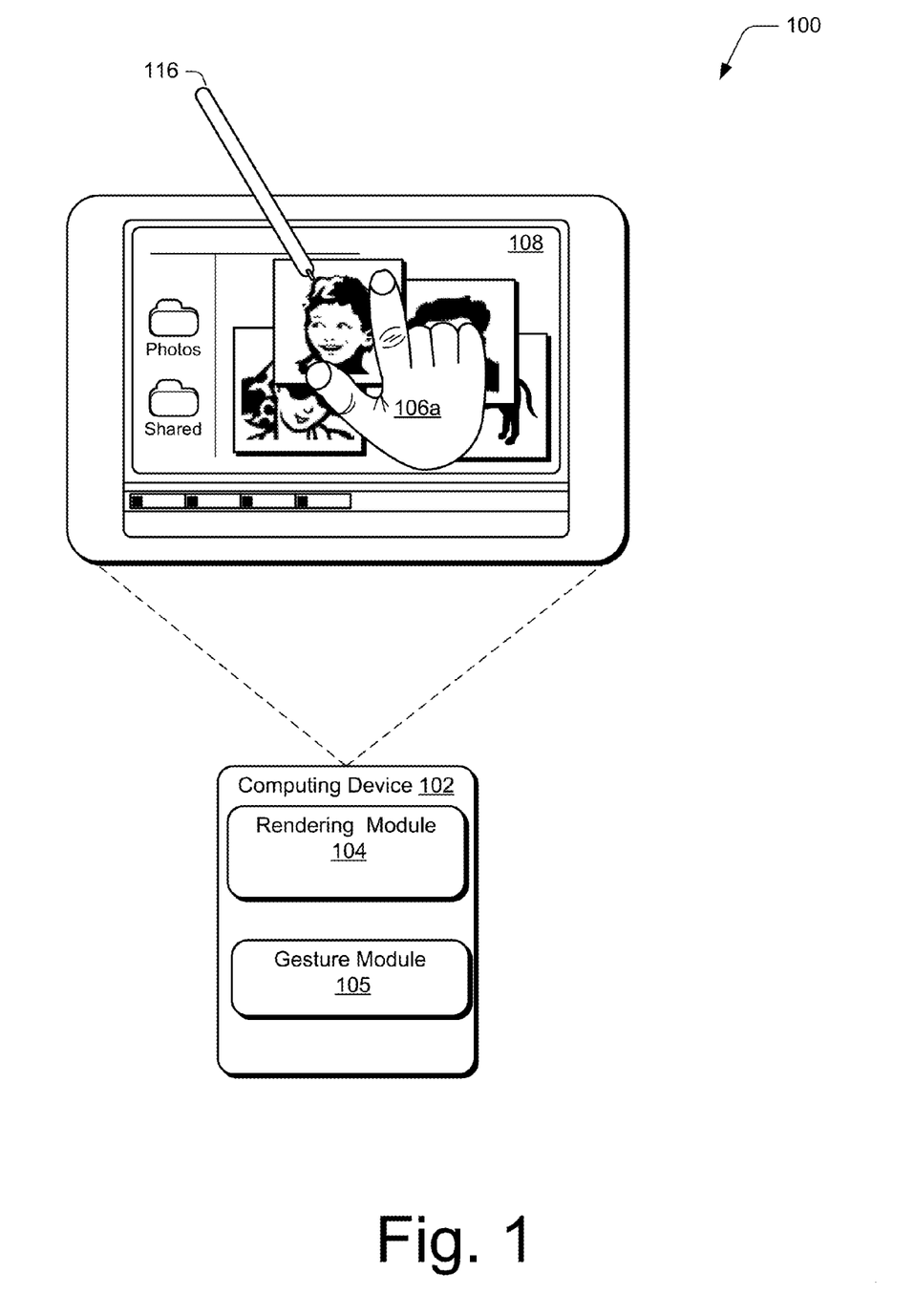
FIG. 1 is an illustration of an environment in an example implementation in accordance with one or more embodiments.

FIG. 1 is an illustration of an environment 100 in an example implementation that is operable to employ the techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes, among other components, a rendering module 104 and a gesture module 105.

In one or more embodiments, the rendering module 104 and other layout pipeline components are configured to intelligently render or pre-rendering content that may likely be brought into an associated viewport during a user's interaction with the content. In at least some embodiments, the process of caching pre-rendered content is separated from a determination of which regions outside of the viewport are to be kept up to date over use and time. Further, at least some embodiments perform rendering activities in multiple passes in an effort to reduce potential delays in the user visible content reaching completion, without interfering with other work that an associated application or system performs during rendering.

The gesture module 105 recognizes input pointer gestures that can be performed by one or more fingers, and causes operations or actions to be performed that correspond to the gestures. The gestures may be recognized by module 105 in a variety of different ways. For example, the gesture module 105 may be configured to recognize a touch input, such as a finger of a user's hand 106*a* as proximal to display device 108 of the computing device 102 using touchscreen functionality, or functionality that senses proximity of a user's finger that may not necessarily be physically touching the display device 108, e.g., using near field technology. Module 105 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand 106*a*) and a stylus input (e.g., provided by a stylus 116), as well as other inputs such as mouse and keyboard inputs. The differentiation may be performed in a variety of ways, such as by detecting an amount of the display device 108 that is contacted by the finger of the user's hand 106*a* versus an amount of the display device 108 that is contacted by the stylus 116.

Thus, the gesture module 105 may support a variety of different gesture techniques through recognition and leverage of a division between stylus and touch inputs, as well as different types of touch inputs and non-touch inputs.

Figure 2:
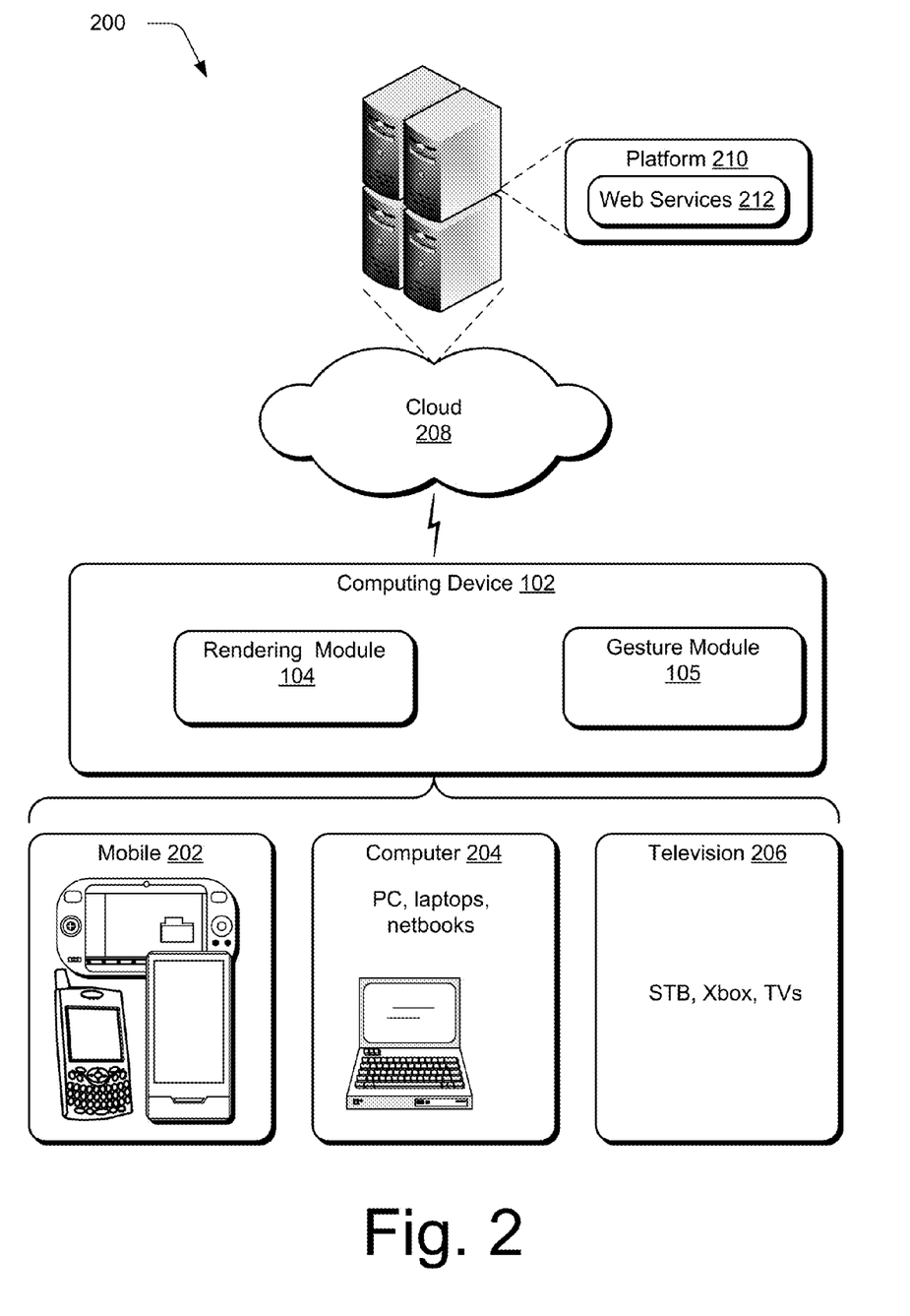
FIG. 2 is an illustration of a system in an example implementation showing FIG. 1 in greater detail.

FIG. 2 illustrates an example system 200 showing the rendering module 104 and gesture module 105 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the gesture module 105 may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe various example embodiments. A section entitled "Separation of Caching and Region Determination" describes how content caching and region determination are separated, for process purposes, in accordance with one or more embodiments. Next, a section entitled "Multi-Pass Rendering" describes how rendering can be performed efficiently utilizing multiple passes in accordance with one or more embodiments. Last, a section entitled "Example Device" describes aspects of an example device that can be utilized to implement one or more embodiments.

Having described example operating environments in which the inventive principles can be employed, consider now a discussion of example embodiments.

Separation of Caching and Region Determination

Prior to discussing the various embodiments below, consider the following motivations directed to improving the user's perceived visual experience. In operation, it is desirable for an application to feel like a real surface for the user. The application should respond to manipulations immediately and track manipulations without a lag, although such is not always possible. Therefore, the embodiments discussed below are directed to mitigating lags and enhancing the user's experience. With respect to visual coherence, as an application is manipulated by the user, the content on the display screen or device should not show artifacts that degrade the user's immersion or confidence. That is, it is desirable to reduce, to the extent possible, the presence of seams, visible tearing or corruption, and/or user interface lagging between different portions of a user interface component. With respect to visual completeness, it is desirable for a user to rarely see a filler pattern, e.g., a checkerboard, covering parts of the screen. If such filler pattern is to be provided, it is desirable to provide such filler pattern for short durations. Surface content updates, however, cannot be guaranteed for open-ended rich content that is presented on low powered devices across all zoom levels. Moreover, with respect to live surfaces, animations, video, and JavaScript should continue to play and be executed during user manipulations without stutter. Clearly, however, there are some trade-offs with these motivations, particularly when displaying rich content on low powered devices.

One of the motivations for separating caching and determining which regions are to be kept up-to-date, as described below, pertains to maintaining visual consistency for the user in view of invalidations that are received. Specifically, in embodiments described below, content is trimmed or discarded in view of invalidations that are received, in order to maintain visual consistency. This ensures that when rendering operations are performed, trimmed content is not rendered. Rather, placeholder content is inserted in its place.

In the discussion just below, the following terminology is utilized in conjunction with FIG. 3. The "viewport" comprises the visible part of the content that is rendered on the display screen or device. In the figure, this corresponds to the content region that is displayed in FIG. 3 on the display device 108. A "region to keep up to date" or "RKUD," shown at 300, defines the portions (e.g., sub-portions) of a virtual surface (that can hold variable amounts of content outside the viewport) that are rendered or pre-rendered speculatively to avoid showing "checkerboards" or other placeholders during a user's manipulation of content. If a portion of the RKUD is invalid, it is rendered at the earliest opportunity, but after the viewport is rendered. A "cache region" 302 limits the portions of the virtual surface that are cached and maintained if it has valid rasterized content and is a superset of the RKUD. Any region 304 beyond the cached region is trimmed, as will become apparent below. If part of the cache region is invalidated and it is not in the RKUD, it will simply be discarded. A trimmed invalid region 306 is shown that has portions that lie in the cache region 302 and RKUD 300, as will become apparent below. In various embodiments, the total area allowed in the cache region is capped to cap the video memory that is used. Note that when a user manipulation begins and the RKUD is updated to be expanded only in the direction of the user manipulation, the previous contents of the RKUD stay in the cache region unless they are invalidated (e.g. by script/layout changes) or the viewport moves out too far.

When separating the process of caching pre-rendered regions and determining which regions are to be kept up to date, several factors come into play. First, various policies are employed to determine expansion rate and direction of pre-rendering based on use and over time. Further, techniques are utilized to constrain expansion on manipulations such as zooming out. Further, various approaches provide an ability to trim content in the cached region that have become invalidated that will not be rendered right away. Further, tracking mechanisms are utilized to track invalidations over time in order to clip regions within the RKUD.

With respect to the separation described above, consider the following.

Figure 3:
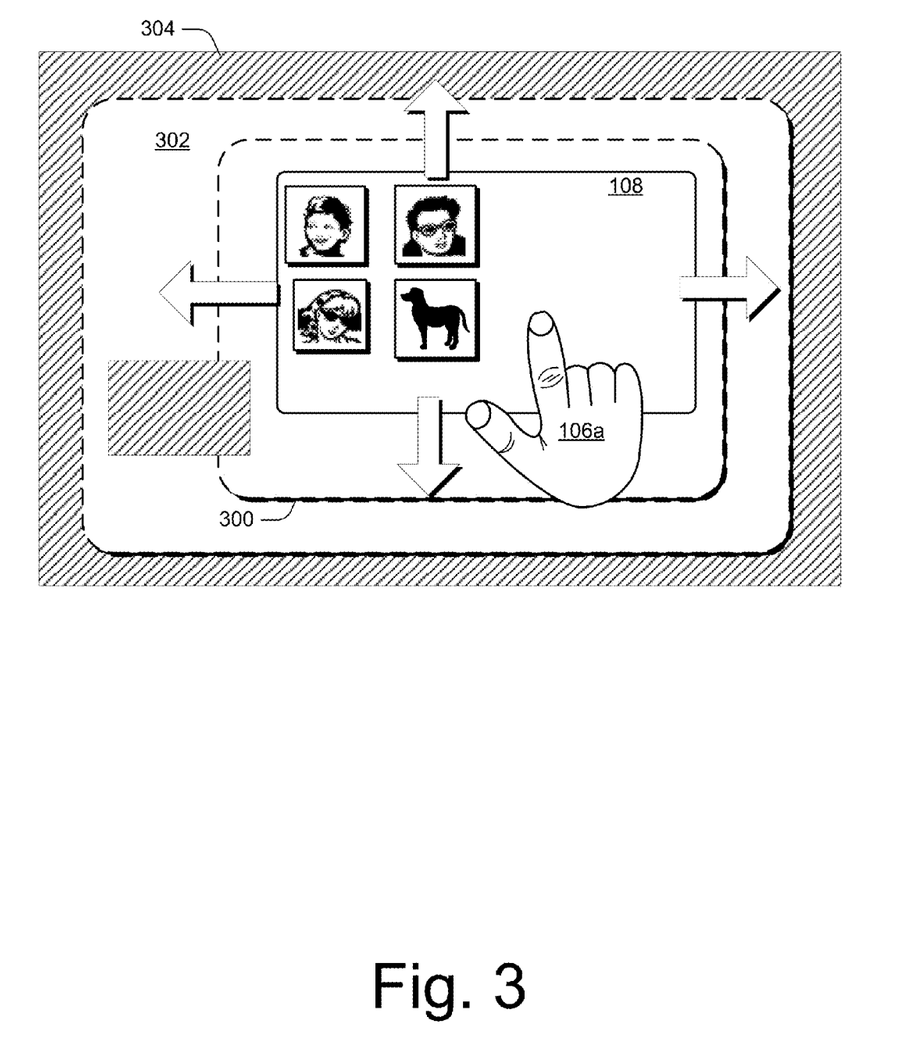
FIG. 3 is an illustration of an example viewport and associated virtual surface that lies outside the viewport, in accordance with one or more embodiments.

Assume that a web page is displayed within the viewport as shown in FIG. 3. The web page has viewable portions that appear not only within the viewport as shown, but portions that lie within the virtual surface above, below and to the sides of the viewport. In the page portion above the viewport, assume that the entire page portion has been pre-rendered and cached. In the center of the pre-rendered portion, assume that a rectangle in the center of that portion gets invalidated. For example, invalidation may occur when new content, such as a new article or advertisement, is received to replace the content that previously appeared in the rectangle. At this point, assume that the rendering module has determined that pre-rendered content appearing in the cached page portion is to remain cached. However, the invalidated portion of the pre-rendered content is not to again be pre-rendered because it is out of view. In this instance, the invalidated portion can be clipped or discarded from the cached region. This can serve to make the rendering process within the viewport more efficient by conserving rendering resources and overhead. If the user manipulates the display to scroll up, the invalidated portion can now be rendered because it has or is likely to some into view. That is, rendering or pre-rendering decisions based on rendering policies within the virtual surface can be made based on the direction of user manipulation.

Continuing the example, assume now that the user scrolls down by gesturally flicking the touch display. At this point, the rendering module, governed by the rendering policies, can render and pre-render content that is in the direction of the user manipulation within the virtual surface below the viewport. Since content in the virtual surface that lies to the left and right of the viewport is not likely to be viewed, given the current direction of manipulation, such content is not pre-rendered. Rather, the content in the direction of the manipulation is pre-rendered. In at least some embodiments, at least some of the previously pre-rendered content that lies above the viewport in the virtual surface can remain cached in the event the user returns in that direction.

In this manner, rendering policies are used to not only drive pre-rendering decisions in a given manipulation direction, but to identify previously pre-rendered content within the virtual surface that is to remain cached and up to date. In at least some embodiments, however, content within the virtual surface that is pre-rendered can be clipped or discarded in the event it becomes invalidated.

In one or more embodiments, decisions or policies can determine how much of the content within the virtual surface is to be pre-rendered and cached. For example, given a particular system's memory resources, intelligent decisions can be made to use particular amounts of memory resources. Consider, for example, that a policy sets a threshold of x number of screenfuls of content around the current viewport are to remain cached and updated. As long as content within the virtual surface is still within x number of screenfuls relative to the viewport, this content will remain cached. As soon as the content falls outside of the threshold that is set, it can be trimmed and discarded.

Figure 4:
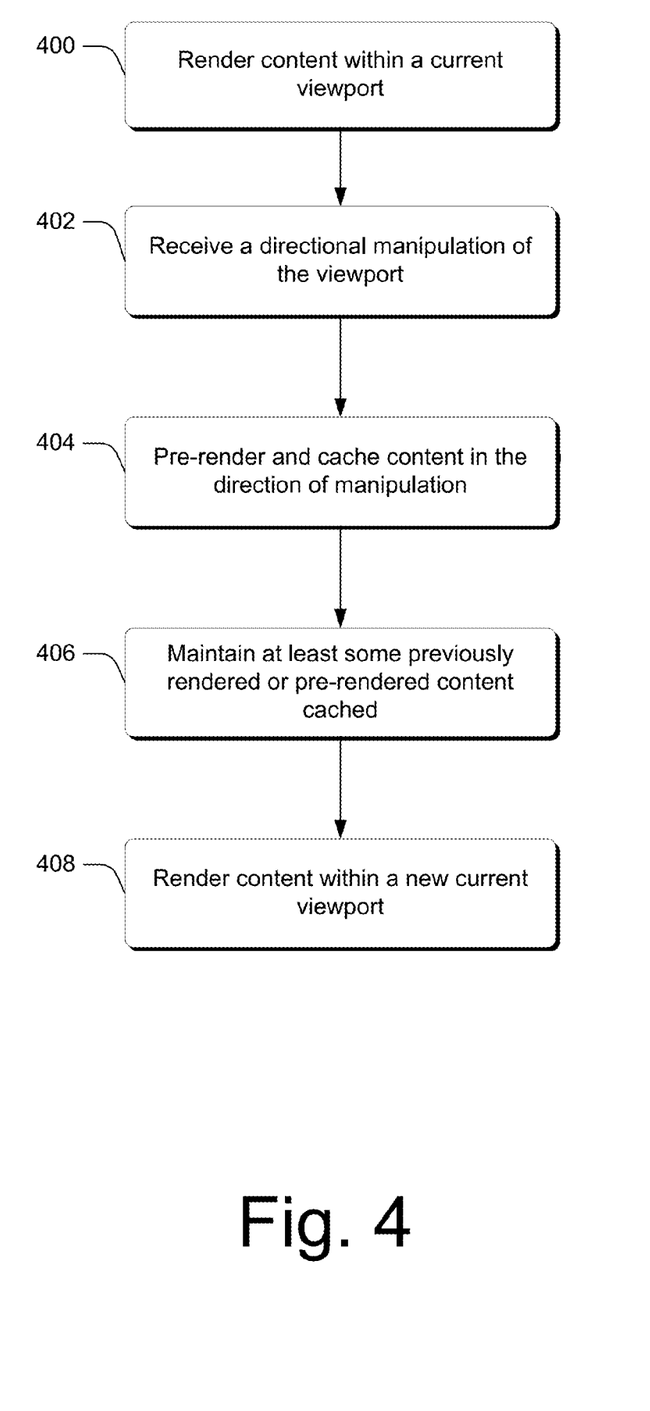
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, the method can be implemented by a suitably-configured rendering module such as the one described above.

Step 400 renders content within a current viewport. This step can be performed in any suitable way. For example, this step can be performed by an application such as, by way of example and not limitation, a web browser or other suitably-configured application. In addition, content within the virtual surface can be pre-rendered at this stage as well. Such can be done in anticipation of the user manipulating the content in some way, such as by scrolling up or down or panning to a particular side. Step 402 receives a directional manipulation of the viewport. The step can be performed in any suitable way. For example, a directional manipulation can be received via an input device such as a mouse, through touch input, or through a natural user interface. Responsive to receiving the directional manipulation of the viewport, step 404 pre-renders (or continues to pre-render content) and caches content in the direction of manipulation. This step can be performed in any suitable way using any suitable types of policies to drive the pre-rendering decisions. Non-limiting examples of such policies are provided above. Step 406 maintains at least some previously-rendered or pre-rendered content cached. This step can be performed in any suitable way. For example, various policies can be utilized to determine how much content to efficiently maintain in the cache. Specifically, in at least some embodiments, content that is maintained in the cache but which becomes subsequently invalidated can be clipped or discarded. Step 408 renders content within a new current viewport. This can be performed by committing pre-rendered content within a virtual surface so that it can be visually rendered. In at least some embodiments, portions that have been trimmed or discarded will not be rendered immediately.

With respect to the techniques that are utilized to constrain expansion on manipulations such as zooming out, consider the following.

When a user performs manipulations on content, such as a zoom out manipulation, an increased load is placed on the system by virtue of having to invalidate the content and render it into a smaller form. In one or more embodiments, instead of using this approach, when a zoom out manipulation is detected, the associated surfaces that were already rendered are provided to a compositor which, in turn, composes them into smaller surfaces for the screen. In this approach, the content is not re-rasterized. Rather, the compositor applies a transform to shrink the surfaces to achieve a desirable size for a given screen.

As will be appreciated by the skilled artisan, the process cost of using a compositor to implement a zoom out manipulation is typically significantly smaller than the processing cost of rasterizing the content into those surfaces. Because of the zoom factor, a large number of surfaces may need to be rendered/cached and then shrunk down to cover the extended viewport. This rapidly becomes very costly as the user quickly zooms out, both in cache memory cost and rendering cost. In order to deal with this scenario, when a rapid zoom out is detected beyond a threshold, the viewport is no longer tracked. Rather, the content that has been rendered thus far is locked and shrunk or moved around until the manipulation ends or the user zooms back in within the threshold. This results in a better user experience and utilizes significantly less resources in terms of computing and caching.

With respect to tracking invalidations over time in order to clip or discard regions of content, consider the following.

Assume that a rectangle that resides in the virtual surface above the viewport has active animation or some other video running in it. This type of content would result in repetitive invalidations and re-rendering operations that would never be seen by the user. Yet, other content in the virtual surface may get invalidated infrequently. In one or more embodiments, invalidations that occur outside of the viewport can be tracked in terms of how frequently the invalidations happen. One or more thresholds can be set and for those regions that exceed a certain number of invalidations over time, such regions can be clipped or discarded or throttled or painted less frequently. For example, consider the following example approach. X number of buckets are maintained covering Yms periods over the last Z seconds. Each bucket has a region (e.g. list of rects) that were invalidated in that period. As new invalidations are received, they are tracked in the current bucket. As time passes the buckets are shifted, dropping the oldest one. When determining if a region should be rendered, the buckets are consulted and parts of the invalidation that are seen repeatedly invalidated in multiple buckets are identified and then removed out of the regions that are to be rendered.

Multi-Pass Rendering

In multi-pass rendering, a rendering loop may be utilized, although multi-pass rendering may be performed with no rendering loop. That is, the term "multi-pass" refers to the ability to leave some invalidated regions unrendered. So, for example, in some multi-pass rendering embodiments that do not utilize a rendering loop, when a paint event is received, only a subset of the invalid region is rendered. Then, a future paint event is scheduled in order to consider the next subset. This gives non-painting work a higher priority. In embodiments a rendering loop can be utilized with single pass rendering. For example, when a paint event is received, all invalid regions are painted without yielding control to the application. The status of the viewport is queried and the region to be kept up-to-date (RKUD) is updated if the viewport moved sufficiently during painting. If the RKUD was changed, which implies the presence of new invalid regions, then the process loops. Thus, the subsequent paints performed by the loop are synchronous. This gives painting the highest priority. An embodiment of both can involve switching between the two distinct modes (e.g., when a user's finger is down, painting is the highest priority) or merging both (e.g., each iteration in the loop may paint only a subset).

During user manipulations, in order to ensure that rendering receives the appropriate priority over other application work, an approach is utilized that queries the current state of the viewport to ensure that the right content is rendered in a loop which can be periodically yielded to other application work. Further, for processing efficiencies and in order to allow rendered content and user visible parts to reach the display faster, sub-portions of the viewport and RKUD are rendered at a time and committed, rather than rendering the entire viewport or RKUD in a single pass. Further, various policies are employed to determine the appropriate sub-portions around the viewport that are to be rendered in each pass, in the face of incoming invalidations and viewport changes. In addition, various policies are employed that control delayed rendering of the RKUD based on such things as incoming invalidations and viewport changes.

With respect to using a rendering loop to ensure that rendering receives the proper priority over other application work, consider the following.

In some instances, the content within the viewport may be changing rapidly such that it is desirable to aggressively render content within the changing viewport. For example, a user may gesturally touch-flick the display device to scroll down rapidly. The inertia of the gesture causes the viewport to move downwardly. In these and other instances, it is desirable to aggressively render content to maintain a desirable user experience. Yet, the application may have work that it desires to perform, such as running script, sending messages, utilizing timers and scroll handlers and the like, which are not strictly necessary or can be batch processed, e.g., instead of notifying scroll offset change multiple times in small offset changes, such is performed once with a larger change. If the rendering process were to yield to the application in these instances, rendering would fall behind and the user experience would be degraded.

Accordingly, in one or more embodiments, a rendering loop is utilized in order to render content within the viewport when the viewport rapidly changes. Viewport changes can be manifest in invalidations that occur on account of changing content due to the manipulations. The rendering loop is time constrained to render content for a defined period of time, e.g., 200-300 ms, without yielding to the application. During the rendering loop, the rendering module ascertains which regions of the viewport have become invalidated and renders into those regions. During the rendering loop, the rendering module can also pre-render content in the virtual surface after content has been rendered in the viewport. Pre-rendering content in the virtual surface can be performed by pre-rendering sub-regions or sub portions of the virtual surface in the direction of the manipulation, in order to efficiently utilize rendering resources as described below. After the period of time has passed, rendering can yield to the application to allow the application to perform the work that it desires to perform, such as sending notifications and messages to various components. The problem that this addresses is that the viewport is trying to be painted and, by the time such painting has occurred, the user may have already further moved the viewport. The other problem is that if too much content is attempted to be rendered and committed in a single pass, the time that it takes for all of the content to reach the screen is delayed. Accordingly, a desirable approach is to render small portions in the direction of the manipulation and commit those portions. When this is combined with the multi-pass approach referenced above, when in the aggressive rendering loop, the viewport is treated as expanded by a smaller amount (e.g., 20%) in the direction of the manipulation. In addition, measures undertaken to ensure that this part remains painted and committed before attempts are made to paint ahead in larger portions from the RKUD.

With respect to rendering sub-portions of the viewport and RKUD at a time, rather than rendering the entire viewport or RKUD in a single pass, consider the following. Pre-rendering sub-portions of the RKUD at a time can enable the rendering module to query the viewport and ascertain whether any regions within the viewport have become invalid during rendering loop. If so, the rendering module can return to render content within the viewport that has become invalid, thus maintaining the user's experience. Any suitable techniques can be utilized to ascertain which sub portions of the RKUD to pre-render. In at least some embodiments, policies are employed to prioritize sub-portions within the virtual surface to pre-render. Sub-portions can be prioritized within the virtual surface based on their associated distance to the viewport. That is, sub-portions that are farther away from the viewport are prioritized lower than sub-portions that are closer to the viewport. For example, a sub-portion size, such as a quarter viewport, can be utilized to define sub-portions of the virtual surface. The sub-portions can be prioritized and sorted for pre-rendering activities. Those sub-portions that are closer to the viewport are pre-rendered before sub-portions that are further away. Assume, for example, the viewport moved to a new location such that all content within the previous viewport and content within the virtual surface around the viewport is invalid. In this instance, content within the viewport is rendered first and then the priority-based, pre-rendering process is utilized to pre-render content within the virtual surface during a particular rendering loop. So, for example, when pre-rendering content within the virtual surface, a prioritized sub-portion below the viewport can be rendered first, followed by a prioritized sub-portion above the viewport, followed by prioritized sub-portions to the left and right respectively of the viewport. After the pre-rendering each a subportion, the viewport can be queried to ascertain whether there have been any validations. If so, rendering activities can return to the viewport.

Figure 5:
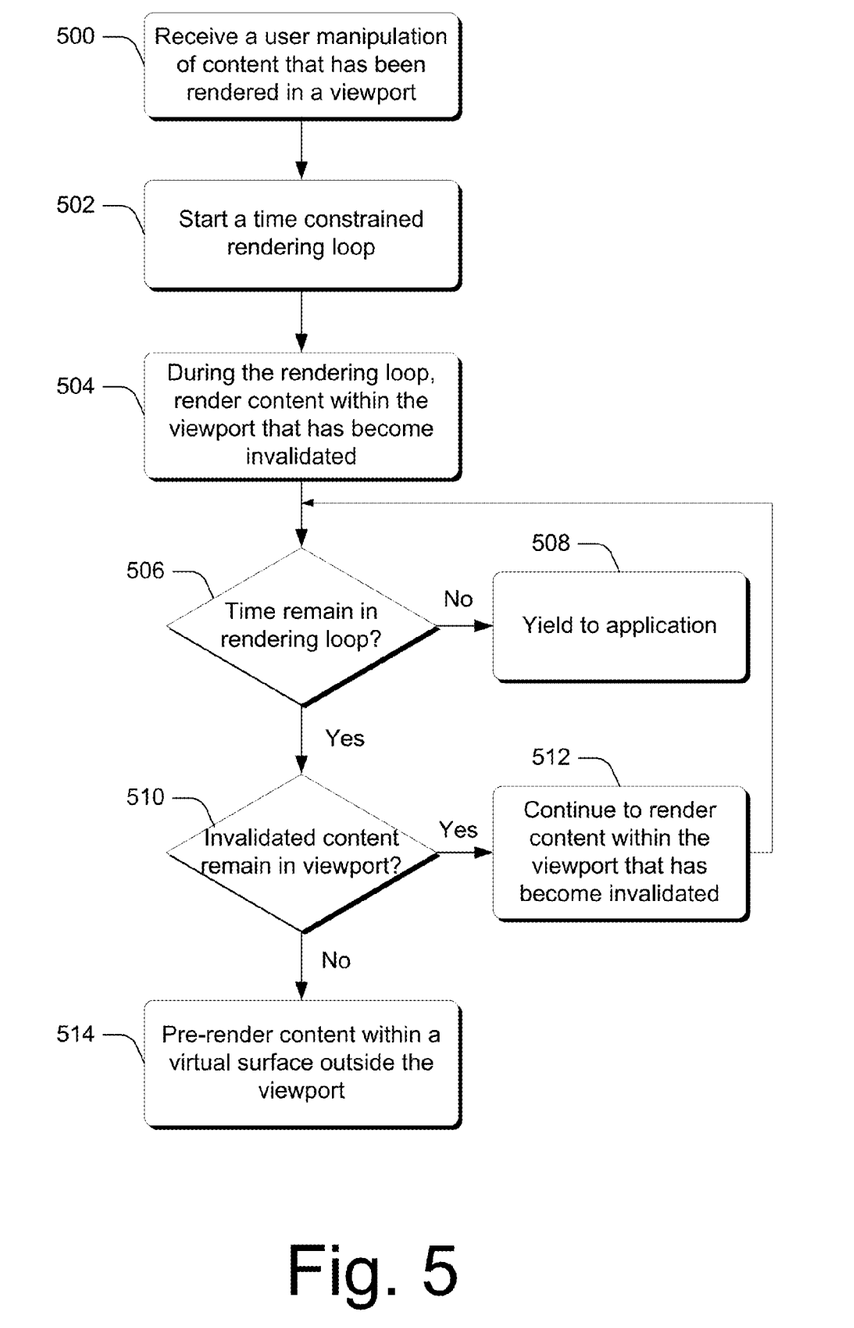
FIG. 5 is a flow diagram that describes steps in a method in accordance with one or more embodiments.

FIG. 5 is a flow diagram that describes steps in a method in accordance with one or more embodiments. The method can be performed in connection with any suitable hardware, software, firmware, or combination thereof. In at least some embodiments, the method can be implemented by a suitably-configured rendering module such as the one described above.

Step 500 receives a user manipulation of content that has been rendered in a viewport. Any suitable type of user manipulation can be received, examples of which are provided above. Responsive to receiving the user manipulation of content, step 502 starts a time constrained rendering loop. Any suitably-configured time constrained rendering loop can be utilized, examples of which are provided above. Step 504 renders content within the viewport that has become invalidated during the rendering loop. Step 506 ascertains whether time remains in the rendering loop. If no time remains in the rendering loop, step 508 yields to an associated application so that the application can perform work, examples of which are provided above.

If, on the other hand, time remains in the rendering loop, step 510 ascertains whether invalidated content remains in the viewport. If invalidated content remains in the viewport, step 512 continues to render content within the viewport that has become invalidated. If, on the other hand, invalid content does not remain in the viewport or, alternately, only a small portion of invalidated content remains in the viewport, step 514 pre-renders content within a virtual surface that lies outside of the viewport. Examples of how content can be pre-rendered within the virtual surface are provided above.

This process can continue during the pendency of the received user input. For example, if user input is continuously received, this process can repeat to ensure that content rendering within the viewport is prioritized over pre-rendering activities in the virtual surface while, at the same time, periodically yielding to an associated application, e.g., a web browser, so that the web browser can perform work associated with the user manipulation.

When not in an aggressive rendering loop, delayed rendering of the RKUD can be utilized in order to not interfere with other application work such as loading a document, interacting with the user and the like. In these instances, one can wait for Xms (e.g. 100-200 ms) after a viewport update. If the viewport gets significantly updated again, then the RKUD update can be further pushed out up to a maximum (e.g. 1000 ms) from the time painting was first intended. Then, portions of the RKUD that do not seem to get invalidated can get painted. (e.g., the time bucket based invalidation filtering described above can be utilized).

Having considered an implementation example, consider now an example device that can be utilized to implement one or more embodiments as described above.

Figure 5A:
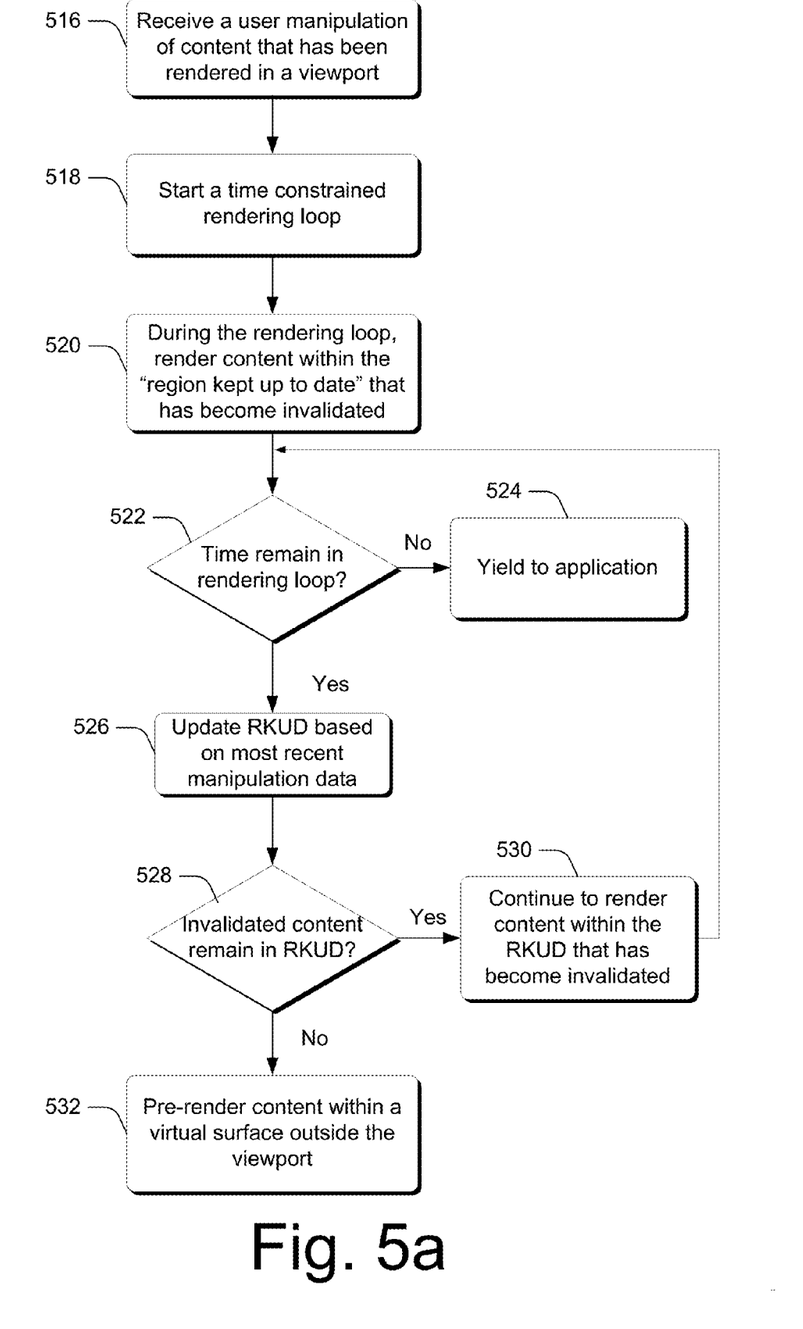
FIG. 5a is a flow diagram that describes steps in a method in accordance with one or more embodiments.

FIG. 5a is a flow diagram that describes steps in a method of updating a region to be kept up-to-date (RKUD) in accordance with one or more embodiments. The method can be performed in connection with any suitable hardware, software, firmware, or combination thereof. In at least some embodiments, the method can be implemented by a suitably-configured rendering module such as the one described above.

Step 516 receives a user manipulation of content that has been rendered in a viewport. Any suitable type of user manipulation can be received, examples of which are provided above. Responsive to receiving the user manipulation of content, step 518 starts a time constrained rendering loop. Any suitably-configured time constrained rendering loop can be utilized, examples of which are provided above. Step 520 renders content within the RKUD that has become invalidated during the rendering loop. Step 522 ascertains whether time remains in the rendering loop. If no time remains in the rendering loop, step 524 yields to an associated application so that the application can perform work, examples of which are provided above.

If, on the other hand, time remains in the rendering loop, step 526 updates the RKUD based on the most recent manipulation data. Step 528 ascertains whether invalidated content remains in the RKUD. If invalidated content remains in the RKUD, step 530 continues to render content within the RKUD that has become invalidated. If, on the other hand, invalid content does not remain in the RKUD, step 532 pre-renders content within a virtual surface that lies outside of the viewport. Examples of how content can be pre-rendered within the virtual surface are provided above.

This process can continue during the pendency of the received user input.

Example Device

Figure 6:
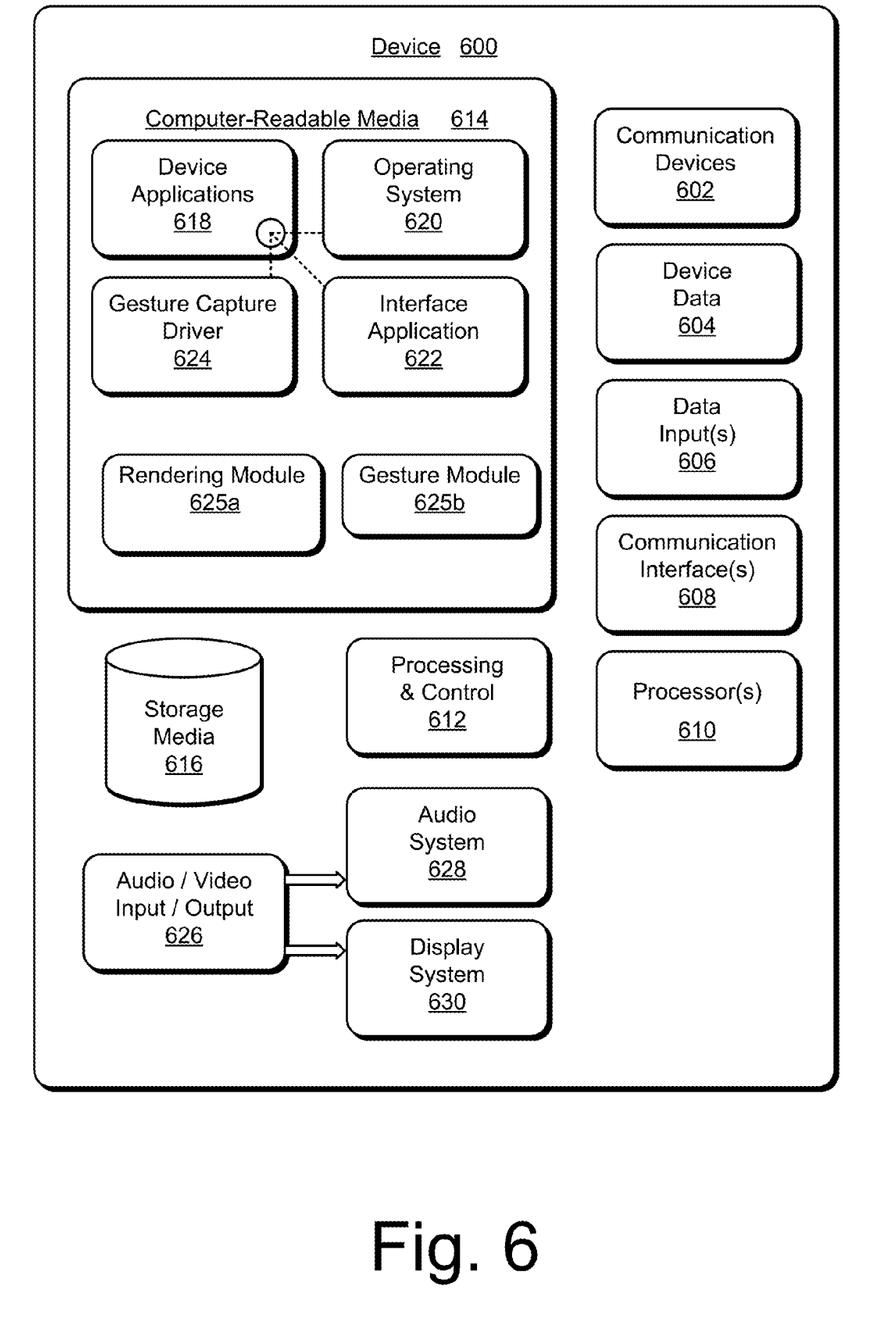
FIG. 6 illustrates an example computing device that can be utilized to implement various embodiments described herein.

FIG. 6 illustrates various components of an example device 600 that can be implemented as any type of portable and/or computer device as described with reference to FIGS. 1 and 2 to implement embodiments of the animation library described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable or readable instructions to control the operation of device 600 and to implement the embodiments described above. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 618 also include any system components or modules to implement embodiments of the techniques described herein. In this example, the device applications 618 include an interface application 622 and a gesture-capture driver 624 that are shown as software modules and/or computer applications. The gesture-capture driver 624 is representative of software that is used to provide an interface with a device configured to capture a gesture, such as a touchscreen, track pad, camera, and so on. Alternatively or in addition, the interface application 622 and the gesture-capture driver 624 can be implemented as hardware, software, firmware, or any combination thereof. In addition, computer readable media 614 can include a rendering module 625a and a gesture module 625b that function as described above.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

Conclusion

Various embodiments are directed to intelligently rendering or pre-rendering content that may likely be brought into an associated viewport during a user's interaction with the content. In at least some embodiments, the process of caching pre-rendered content is separated from a determination of which regions outside of the viewport are to be kept up to date over use and time. Further, at least some embodiments perform rendering activities in multiple passes in an effort to reduce potential delays in the user visible content reaching completion and reaching the display, without interfering with other work that an associated application or system performs during rendering.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
    rendering content within a current viewport;
    receiving a directional manipulation of the viewport;
    responsive to receiving the directional manipulation of the viewport, starting a time-constrained rendering loop;
    pre-rendering and caching content for the manipulation that lies in a virtual surface outside of the viewport, in the direction of the manipulation, wherein the content that lies in the virtual surface outside of the viewport is pre-rendered as long as time remains in the rendering loop and responsive to ascertaining that no invalidated content remains in the viewport;
    maintaining cached:
        at least some previously-rendered pre-rendered content, the at least some previously-rendered pre-rendered content having been identified based on one or more rendering policies that control which of the previously-rendered pre-rendered content is to remain cached; and
        the content that is pre-rendered for the manipulation; and
    rendering content, that includes at least some of the cached content, within a new current viewport.

2. The method of claim 1 further comprising discarding one or more portions of content that are determined invalidated in the virtual surface to enable rendering of placeholder content in place of the one or more portions.

3. The method of claim 1, wherein pre-rendering content comprises utilizing a threshold number of screenfuls of content within the virtual surface to determine an amount of content that is pre-rendered.

4. The method of claim 1 further comprising responsive to detecting a zoom out manipulation, beyond a threshold, to the previously-rendered pre-rendered content, locking the previously-rendered pre-rendered content and applying a transform to the previously-rendered pre-rendered content rather than re-rasterizing content that is zoomed out.

5. The method of claim 1 further comprising tracking invalidations over time to discard one or more portions of content.

6. The method of claim 1 further comprising tracking invalidations over time to discard one or more portions of content that are invalidated multiple times.

7. The method of claim 1, wherein said receiving a directional manipulation comprises receiving a touch manipulation.

8. The method of claim 1 further comprising prior to receiving the directional manipulation, pre-rendering and caching at least some other content that lies in the virtual surface.

9. The method of claim 1, wherein said pre-rendering is performed by prioritizing sub-portions within the virtual surface.

10. The method of claim 1, wherein said pre-rendering is performed by prioritizing sub-portions within the virtual surface based on an associated distance to the viewport.

11. The method of claim 1, further comprising ascertaining whether invalidated content remains in the viewport and if so, rendering content within the viewport that has become invalidated.

12. A device comprising:
    one or more modules implemented at least partially in hardware, the one or more modules configured to perform operations comprising:
        receiving a user manipulation of content that has been rendered in a viewport, at least some of the rendered content corresponding to one or more non-rendering actions that are performed by an associated application;
        responsive to receiving the user manipulation of content, starting a time-constrained rendering loop;
        rendering content within the viewport that has become invalidated during the rendering loop, including discarding at least some invalidated content to render placeholder content in place of the invalidated content;
        suspending, during the rendering loop, performance of the one or more non-rendering actions that are performed by the associated application;
        ascertaining whether time remains in the rendering loop;
        yielding to the associated application if no time remains in the rendering loop, the yielding enabling the associated application to perform the one or more non-rendering actions; and
        performing rendering if time remains in the rendering loop, including ascertaining whether invalidated content remains in the viewport and, if not, pre-rendering content within a virtual surface that lies outside of the viewport.

13. The device of claim 12, wherein the time-constrained rendering loop is constrained between 200-300 ms.

14. The device of claim 12, wherein performing rendering comprises ascertaining whether invalidated content remains in the viewport and if so, continuing to render content within the viewport that has become invalidated.

15. The device of claim 12, wherein the content within the virtual surface that lies outside of the viewport is pre-rendered in a direction of the user manipulation.

16. The device of claim 12, wherein pre-rendering the content within the virtual surface that lies outside of the viewport includes pre-rendering sub-portions of the virtual surface, at least some of which being in a direction of the user manipulation, effective to allow return of content rendering in the viewport during the rendering loop.

17. The device of claim 12, wherein pre-rendering the content within the virtual surface that lies outside of the viewport includes prioritizing sub-portions to render within the virtual surface.

18. The device of claim 12, wherein pre-rendering the content within the virtual surface that lies outside of the viewport includes prioritizing sub-portions to render within the virtual surface based on their associated distance to the viewport.

19. The device of claim 12, wherein performing rendering comprises:
   ascertaining whether invalidated content remains in the viewport and if so, continuing to render content within the viewport that has become invalidated; and
   wherein said rendering is performed by rendering in a direction of the user manipulation.

20. The device of claim 12, wherein performing rendering comprises performing rendering in a direction of the user manipulation or expanding in all directions in the event of a zoom out manipulation.

\* \* \* \* \*